April 3, 1962 W. E. DU VALL 3,028,556

FREQUENCY-SELECTIVE AUDIO RECEIVER

Filed April 26, 1960 2 Sheets-Sheet 1

INVENTOR.
WILBUR E. DU VALL

BY Lyon & Lyon
ATTORNEYS.

INVENTOR.
WILBUR E. DU VALL
BY Lyon & Lyon
ATTORNEYS.

United States Patent Office 3,028,556

Patented Apr. 3, 1962

3,028,556
FREQUENCY-SELECTIVE AUDIO RECEIVER

Wilbur E. Du Vall, Gardena, Calif., assignor to W. W. Henry Co., Inc., Huntington Park, Calif., a corporation of California Filed Apr. 26, 1960, Ser. No. 24,788
6 Claims. (Cl. 328—136)

This invention relates to frequency-selective audio receivers and, more particularly, to an improved receiver for coded signals.

An object of this invention is to provide a code receiver that does not accept signals not intended for it.

Another object of this invention is the provision of a frequency-selective audio code receiver that is insensitive to static or other interference, such as lightning.

Yet another object of the present invention is the provision of a novel frequency-selective audio code receiver that will not respond to other voice frequencies sharing the same communications link.

Yet another object of the present invention is the provision of a novel, useful audio code receiver which is extremely frequency sensitive.

These and other objects of the invention are achieved in a receiver which receives coded signals transmitted as trains of audio-frequency signals. For each signal received, the receiver generates a pulse for each transition of a signal from a reference-voltage level. These pulses are applied to a closed-gate circuit and also to a delay circuit which delays a pulse for a predetermined interval. This predetermined interval is determined by the frequency to which it is desired the receiver to respond. The output of the delay circuit comprises a narrow pulse, which is also applied to the closed-gate circuit to enable it to be opened in response thereto. If a pulse is present on the other input to the closed-gate circuit during the narrow pulse interval, then this is transmitted to a succeeding delay circuit. This succeeding delay circuit has the function of generating a pulse, the width of which is determined by the number of signals in any given applied train of sginals to said receiver.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
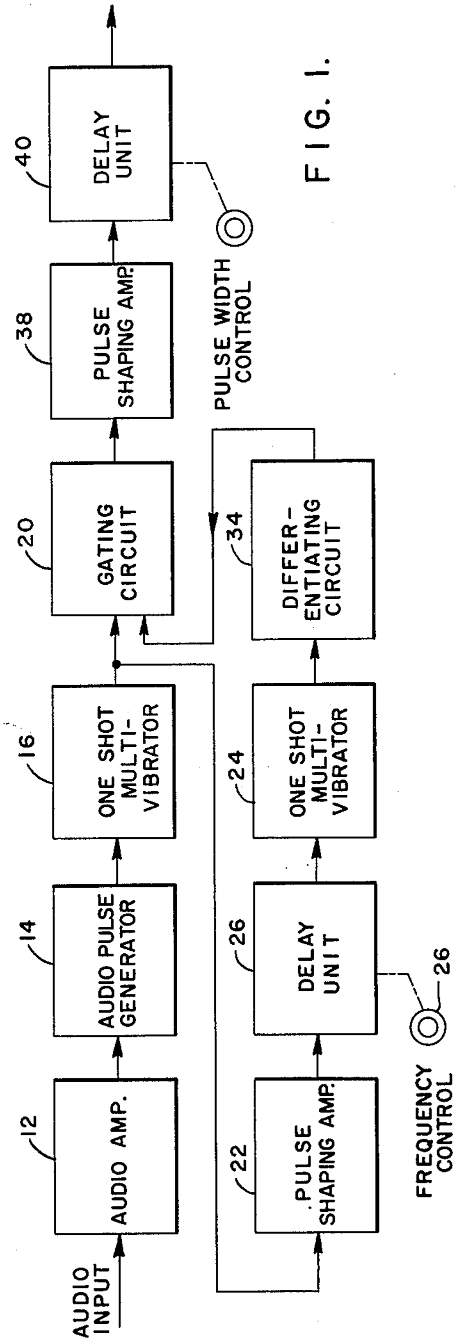
FIGURE 1 is a block diagram of an embodiment of the invention.
Figures 2, 3, 4:
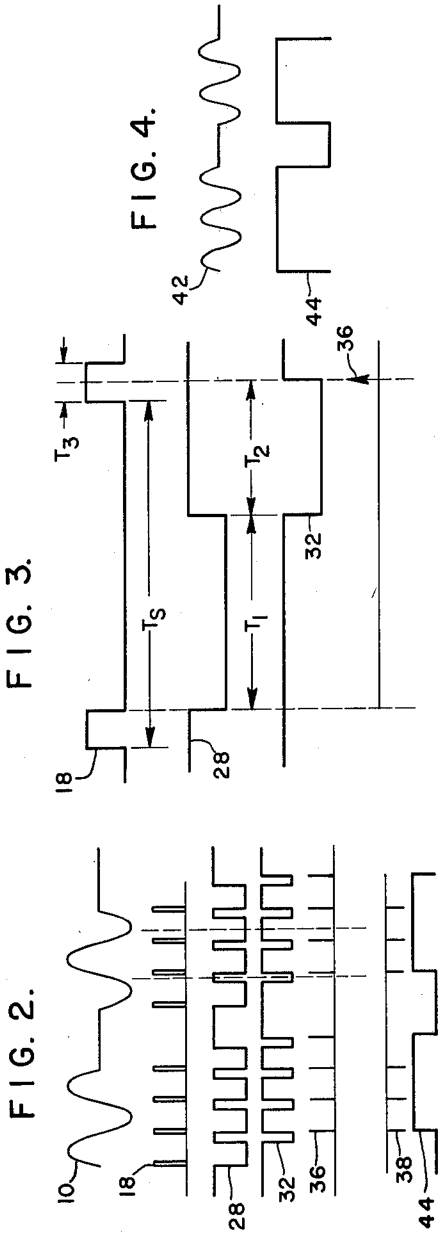
FIGURES 2 and 3 are waveform diagrams which are shown to assist in an understanding of the operation of the embodiment of the invention.
FIGURE 4 is a wave shape diagram shown to assist is an understanding of the operation of the delay circuit.

In the embodiment of the invention about to be described, the signals which are applied thereto will be described as sine wave signals. It should be noted that this is to be considered as exemplary, and not as a limitation upon the invention, since it can respond to other shapes of signals than sine wave signals. Assume, for the purposes of this explanation, that it is desired to have a receiver which will respond solely to sine wave signals occurring at a single audio frequency. The signals are transmitted in trains with the number of sine wave signals in any given train varying in order to represent different letters or symbols. By way of example, the wave shape 10 in FIGURE 2 shows two audio pulse trains, each having one and one-half cycles. One of the pulse trains, however, has two positive-going half cycles, and the other of the pulse trains has two negative-going half cycles.

The received audio pulse trains are applied to an audio amplifier 12, which amplifies the level of the signal received to that required to drive an audio pulse generator 14. It should further be noted that the audio amplifier 12 also includes a limiting device, so that it cannot be overdriven. The audio pulse generator 14 generates a pulse for each transition of the audio from a reference voltage level, which preferably is taken as the zero voltage level. The output of the audio pulse generator 14 is applied to a one-shot multivibrator 16, which standardizes the width of the pulses. In FIGURE 2, the wave shape 18 represents the output of the one-shot multivibrator 16. It will be noted that one of these pulses is provided for each transition from the zero state of the received audio pulse trains.

The output of the one-shot multivibrator is applied to a closed gating circuit 20 and also to a pulse-shaping amplifier 22. The pulse-shaping amplifier shapes the pulses to have the proper waveform for driving a delay unit 26. The interval of the delay provided by the delay unit is variable and may be controlled by the frequency control 26. As will be shown hereafter, establishment of the delay interval determines the frequency to which the receiver is sensitive.

The output of the delay unit is represented by the wave shape 28 shown in FIGURE 2. The delay-unit output is applied to a one-shot multivibrator 30, the output of which is represented by the wave shapes 32 shown in FIGURE 2. The output of the one-shot multivibrator is applied to a differentiating circuit 34 for the purpose of effectively deriving pulse spikes from the trailing edges of the pulses received from the one-shot multivibrator 30. These pulse spikes, or extremely narrow-width pulses, are represented by the wave shapes 36 in FIGURE 2. These pulse spikes are applied to the gating circuit 20. If an output from the one-shot multivibrator 16 is present at the time, the gating circuit is opened by the pulse spike and will pass an output having a width on the order of that of the pulse spike. This is represented by the wave shape 38, shown in FIGURE 2.

Reference will now be made to FIGURE 3 for an explanation of why and how the circuit described thus far is extremely frequency selective. The wave shapes shown in FIGURE 3 are effectively an enlarged section of some of the wave shapes shown in FIGURE 2. These wave shapes bear the same reference numerals as those shown in FIGURE 2. Thus, the wave shape 18 represents the output pulse obtained from the one-shot multivibrator 16. The frequency of occurrence of these output pulses is the frequency of the signals applied to the input to the receiver. Thus, the interval $T_s$ represents, as graphically shown in FIGURE 3, the period which is determined by the frequency of the incoming signal.

The delay unit will delay the occurrence of any output in response to the input for a determinable period which, as represented in FIGURE 3, will be called $T_1$. In response to the output received from the delay unit, the one-shot multivibrator 24 is driven and provides an output pulse having a width which is fixed by the values of the components used in the one-shot multivibrator and which is here represented by the time $T_2$. The trailing edge of the pulse provided by the one-shot multivibrator is converted to a spike pulse 36 by the differentiating circuit 34. Effectively, the wave shapes 18 and 36 are compared by the gating circuit 20. The width of the output pulse 18 of the one-shot multivibrator 16 will be considered as $T_3$. As may be seen by the wave shape diagram, the gating circuit 20 will produce an output any time that the spike pulse 36 and the pulse 18 are simultaneously present at its input.

If the incoming frequency shifts, the time $T_s$, which is a period determined by the frequency of the incoming signal, will change. If $T_s$ changes by an amount plus or minus $(T_3/2)$, then no output pulse will be derived from the gating circuit 20. Thus, if the frequency of the incoming signal is off by more than half of the pulse-width output of the one-shot multivibrator 16, no output is derived from the gating circuit 20. The bandwidth is therefore adjustable by adjusting the width of the pulse derived from the one-shot multivibrator 16. By this technique, extremely high Q's are possible in the audio range. Alternatively expressed, this audio receiver is very, very frequency selective.

The frequency to which the audio receiver responds is determined by adjusting the delay interval of the delay unit for any given fixed pulse width being generated by the one-shot multivibrator 24. Thus, the frequency to which the receiver will respond is substantially determined by $T_1+T_2$. This setting actually is slightly less than one-half cycle of the frequency to which the receiver will respond. The amount by which $T_1+T_2$ are less is one-half of the width of the output pulse from the one-shot multivibrator 16. Since $T_2$ is fixed, frequency response is determined by adjusting $T_1$. Reducing $T_1$, or the delay interval, increases the frequency to which the receiver will respond, and increasing the interval $T_1$ will decrease the frequency to which the receiver will respond.

The output of the gating circuit 20 is applied to a pulse-shaping amplifier 38. The output of the pulse-shaping amplifier 38 is applied to another delay unit 40, which may be similar in construction to the delay unit 24, although not necessarily so. The output of the delay unit 40 is the output of the system. The function of delay unit 40 is to provide an output pulse, the width of which is determined by the number of pulses in any given received pulse train. The delay of the unit is fixed at a value equal to $T_s+T_3+\Delta T$, where $\Delta T$ is the pulse-width stretching time and is adjustable by a pulse-width control for the delay unit. Should a second pulse arrive from the pulse-shaping amplifier 38 before the end of the interval $T_s+T_3+\Delta T$, the delay unit will continue its pulse-stretching function.

FIGURE 4 shows a typical output for a typical input. The sine-wave train 42 is applied to the audio amplifier 12, and the pulse 44 is observed at the output of the delay unit 40. The width of the pulse is determined by the number of half-cycles of the sine waves or signals within any given pulse train.

It will be noted that the receiver comprising the embodiment of the invention starts to respond to an input after the occurrence of half a cycle. It will not respond to any randomly occurring signal, but only to signals having the predetermined frequency as established by the delay interval of the unit 24 and will accept these signals over a bandwidth as determined by the width of the pulse received from the one-shot multivibrator 16. Those skilled in the art will readily recognize that this receiver will respond, not only to sine-wave signals, but also to signals bearing other wave shapes. It will also respond to frequency-modulated signals by providing an output pulse only in the presence of a signal having the predetermined frequency and a shift from this predetermined frequency, as noted by the absence of an output. Thus, the output is a binary representation of the input. Similarly, instead of providing variable-width pulses in response to pulse trains having different numbers of signals, this receiver can respond to binary signals transmitted as the presence or absence of pulses within given intervals which are spaced sufficiently so that the delay unit 40 will not provide other than a standard-width pulse. A preferred arrangement for transmitting code with this receiver is one wherein pulse trains are transmitted having up to eight sine-wave signals. The first of these is not given any code significance, but is transmitted to initiate the operation of the decoding equipment. This should not be taken as a limitation upon the invention, since the audio receiver will respond to any number of cycles or any binary word length.

Figure 5:
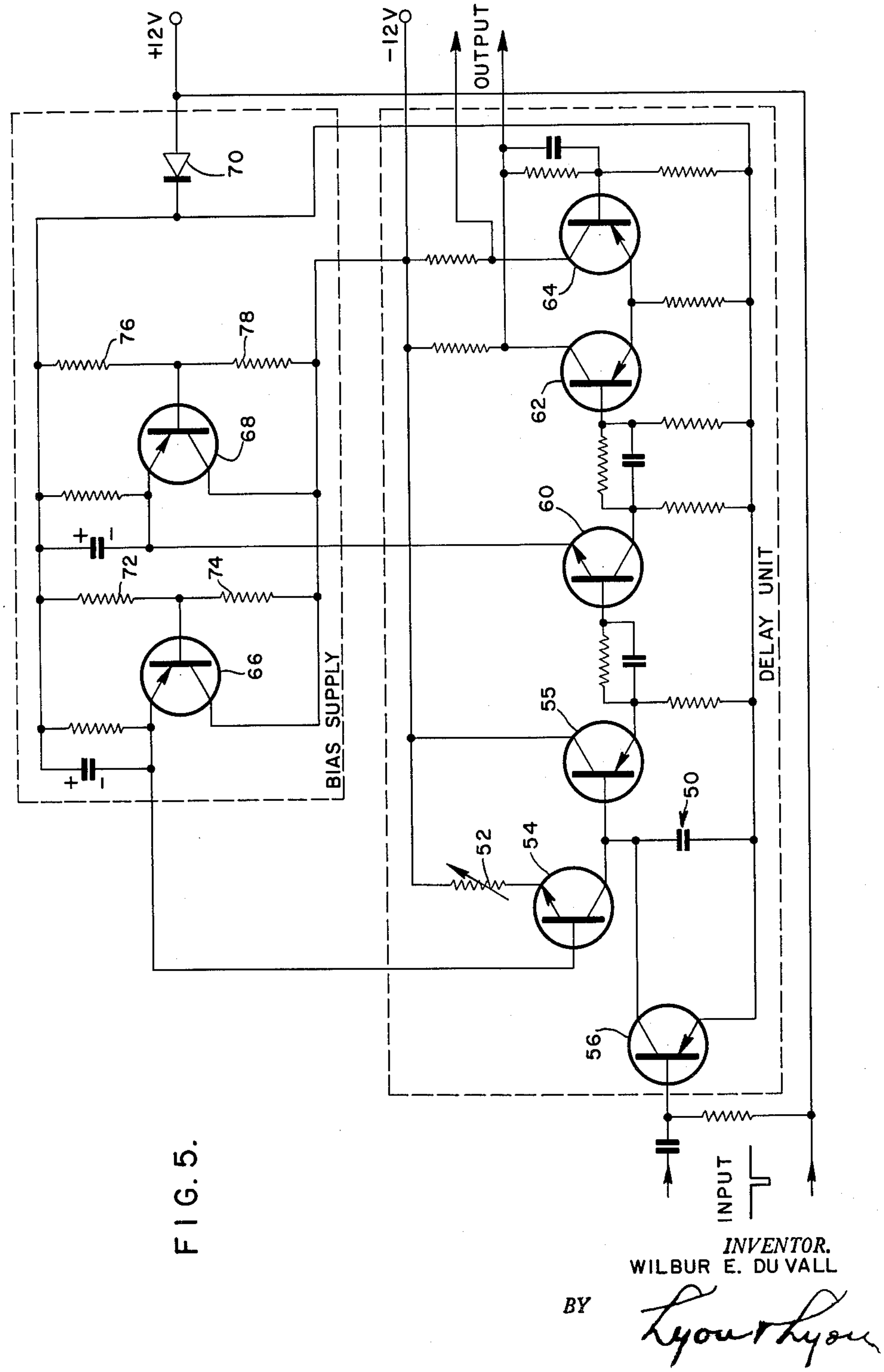
FIGURE 5 is a circuit diagram of a delay circuit which is preferred for employment in the embodiment of the invention.

FIGURE 5 is a circuit diagram of a preferred arrangement for the delay unit which may be employed for either or both of the delay units 24, 40. Effectively, what the system comprises is a capacitor 50, which during a quiescent interval may be charged up via a charging path including a variable resistor 52 which is connected to the emitter of a transistor 54. The collector of the transistor 54 is connected to the capacitor 50. The base of the transistor 54 receives a bias which maintains transistor 54 conductive. In order to discharge capacitor 50, there is provided another transistor 56. The capacitor 50 is connected across the collector and emitter of transistor 56. Negative input signals are applied to the base of transistor 56. The transistor 56 is normally nonconductive. When a negative input pulse is applied to the base of transistor 56, it renders the transistor conductive in saturation, whereby capacitor 50 is discharged rapidly to a very low voltage level.

In order to isolate the capacitor from the following load, another trasistor 55 is employed. This transistor is connected in typical emitter-follower fashion, with its base connected to the capacitor 50 and its emitter connected to the base of a transistor 60. The transistor 60 serves to amplify the voltage received from the capacitor 50 through the isolating transistor 55. Effectively, therefore, its output follows the input which is received from capacitor 50. Transistors 62, 64 are connected in a typical Schmitt trigger circuit configuration whereby, in the presence of an input signal exceeding a predetermined level, the trigger circuit is in one of its two stable states, and when the input signal drops below the predetermined level, it then assumes the other of its two stable states.

Capacitor 50 charges up to a negative potential. Since transistor 60 is of the NPN type, the high negative signal applied to its base holds it non-conducting. In this situation, transistor 64 of the Schmitt trigger circuit is biased to be conductive, maintaining transistor 62 non-conductive. When a negative input pulse is applied to the transistor 56, it becomes conductive and quickly discharges the capacitor 50 toward ground potential. When the level of the capacitor voltage reaches a predetermined value, the transistor 60 is driven to become conductive in saturation, whereby the Schmitt trigger circuit is driven into the stable state with transistor 62 conducting and transistor 64 not conducting. Output, taken from the collectors of both transistors, thereupon reverses polarity.

The Schmitt trigger circuit formed by transistors 62 and 64 is extremely sensitive. It will be noted that if pulses are applied to the base of transistor 56 with a sufficient frequency to prevent capacitor 50 from charging up again above the critical level, the Schmitt trigger circuit formed by transistors 62 and 64 remains in the second stable state and the width of the output pulse is determined by the number of pulses applied to the base of transistor 56. Alternatively stated, the pulse width of the output pulse is the time required for the capacitor 50 to charge up to the switch-over voltage.

In order to render the operation of the delay unit as stable as is possible, a regulated bias supply is provided by means of transistors 66 and 68. A diode 70 is connected between the external source of supply and the two regulator transistors 66, 68. The two transistors are connected in a bridge configuration at the junctions of the respective resistors 72, 74, 76, 78 and regulate the bias voltage applied to the base of the charging transistor 54, as well as the bias voltage applied to the emitter of transistor 60.

It will be appreciated that for any single input pulse the pulse width of the output from the delay circuit is determined by the time required for the capacitor 50 to charge to the switch-over voltage. Since the capacitor charges at a linear rate, changing the slope of the charging ramp can change the basic pulse width generated. The floating bias supply keeps the bias voltages constant at a proportion of the supply voltage. As a result, the output pulse width is independent of supply voltage over as much as a thirty percent variation in the external supply voltage.

This delay circuit has utility independently of the invention as either a variable delay circuit, a multiplier-divider, or many other uses. Those skilled in the art will readily recognize the utility of this circuit from the description which has been given.

Accordingly there has been described and shown herein a novel, useful, and unique receiver for code signals.

I claim:

1. A receiver for receiving coded signals transmitted as trains of audio-frequency signals, each train including one or more signals, said receiver comprising means to which said trains of audio-frequency signals are applied for generating a pulse for each transition of a signal from a reference voltage level, a normally closed-gate circuit, means for applying pulses from said pulse-generating means to said normally closed-gate circuit, means for opening said normally closed-gate circuit responsive to pulses from said pulse-generating means which occur at a predetermined frequency including a variable delay circuit providing a predetermined delay interval to which said pulses are applied, a one-shot multivibrator circuit to which said variable delay circuit output is applied, and means to apply output from said one-shot multivibrator to said normally closed gate circuit to open it in response thereto, the total delay interval of said variable delay circuit and said one-shot multivibrator circuit being substantially equal to the interval of one cycle of said desired frequency less one-half the width of one of said pulses, and means to which said gate circuit output is applied for providing an output pulse the width of which is determined by the number of signals in an applied train of signals.

2. A receiver for receiving coded signals transmitted as trains of substantially sine-wave shape audio-frequency signals each train including one or more signals, said receiver comprising means to which said trains of audio-frequency signals are applied for generating a pulse for each transition of a signal from a reference voltage level, means for delaying a pulse by a predetermined amount, means for applying pulses from said means for generating a pulse to said means for delaying a pulse a predetermined amount, a normally closed-gate circuit, means for applying pulses from said means for generating a pulse to said closed-gate circuit, means for applying output pulses from said means for delaying a pulse a predetermined amount to said normally closed-gate circuit to open it only while each of said output pulses are present, and means to which said gate-circuit output is applied for providing an output pulse the width of which is determined by the number of signals in a train of signals.

3. A receiver for frequency-coded signals as recited in claim 2 wherein said means to which said gate-circuit output is applied for providing an output pulse the width of which is determined by the number of signals in a train comprises a capacitor, means for charging said capacitor, inoperative means for discharging said capacitor, means for rendering said inoperative means operative to discharge said capacitor responsive to each pulse from said gate circuit, a bistable circuit of the type which assumes one stable state when the input applied thereto exceeds a predetermined level and a second stable state when said input is less than said level, means for applying the voltage across said capacitor to said bistable circuit, and means to derive an output from said bistable circuit.

4. A receiver for receiving coded signals transmitted as trains of substantially sine-wave-shaped audio-frequency signals, each train including one or more signals, said receiver including a pulse-generator circuit to which said trains of signals are applied for generating a pulse for each transition of a signal from a reference voltage level, a one-shot multivibrator circuit connected to be driven in response to output from said pulse-generator circuit to produce standard-width pulses, a normally closed gating circuit, means for applying said standard-width pulses to said normally closed gating circuit, means for opening said normally closed gating circuit responsive to standard-width pulses occurring at a predetermined frequency including an adjustable delay circuit adjusted to provide a predetermined delay, means for applying standard width pulses to said adjustable delay circuit, a second one-shot multivibrator connected to be driven by output from said adjustable delay circuit, and means for applying output from said second one-shot multivibrator to said normally closed gating circuit, and a means to which output from said normally closed gating circuit is applied for providing an output pulse, the width of which is determined by the number of signals in a train of signals.

5. A receiver for frequency-coded signals as recited in claim 4 wherein said adjustable delay circuit comprises a capacitor, means including a variable resistor for charging said capacitor, inoperative means for discharging said capacitor, means for rendering said inoperative means for discharging operative to discharge said capacitor responsive to each pulse from said gate circuit, a bistable circuit of the type which assumes one stable state when the input applied thereto exceeds a predetermined level and a second stable state when said input is less than said level, means for applying the voltage across said capacitor to said bistable circuit, and means to derive an output from said bistable circuit.

6. A delay unit comprising a capacitor, means for charging said capacitor including a first transistor having collector, emitter and base, means connecting said capacitor to said first transistor collector, means for biasing said first transistor base to maintain said transistor conductive, means for discharging said capacitor including a second transistor having an emitter, collector and base, means connecting said capacitor between said collector and emitter, means for applying signals to render said second transistor conductive to said second transistor base, a bistable circuit of the type which assumes one stable state when an input applied thereto exceeds a predetermined level and a second stable state when said input is less than said level, means for applying the voltage across said capacitor to said bistable circuit, and means to derive an output from said bistable circuit.

References Cited in the file of this patent

UNITED STATES PATENTS

| | | |
|---|---|---|
| 2,266,401 | Reeves | Dec. 16, 1941 |
| 2,904,683 | Meyer | Sept. 15, 1959 |
| 2,921,260 | Crandon et al. | Jan. 12, 1960 |